United States Patent [19]

Kamath et al.

[11] 4,129,703
[45] Dec. 12, 1978

[54] FREE-RADICAL POLYMERIZATIONS USING MIXED INITIATOR SYSTEMS AT TWO THERMALLY DISTINCT POLYMERIZATION STAGES

[75] Inventors: Vasanth R. Kamath, Tonawanda; Gary A. Harpell, Kenmore, both of N.Y.

[73] Assignee: Pennwalt Corporation, Philadelphia, Pa.

[21] Appl. No.: 757,186

[22] Filed: Jan. 6, 1977

[51] Int. Cl.$^2$ ............................ C08F 4/38; C08F 2/18; C08F 2/02; C08F 12/08
[52] U.S. Cl. .................................... 526/73; 526/228; 526/346
[58] Field of Search .......................... 526/73, 346, 228

[56] References Cited

U.S. PATENT DOCUMENTS

| 2,656,334 | 10/1953 | D'Alelio | 526/73 |
| 2,907,756 | 10/1959 | Doak | 526/73 |
| 3,222,341 | 12/1965 | Barrett et al. | 526/73 |
| 3,252,950 | 5/1966 | Terenzi et al. | 526/73 |
| 3,293,233 | 12/1966 | Erchak, Jr. et al. | 526/73 |
| 3,585,176 | 6/1971 | Gerritsen et al. | 526/73 |
| 3,726,846 | 4/1973 | Squire et al. | 526/73 |
| 3,726,848 | 4/1973 | Squire et al. | 526/73 |
| 3,817,965 | 6/1974 | Mace et al. | 526/228 |

FOREIGN PATENT DOCUMENTS 848620 9/1960 United Kingdom ...................... 526/73
1243197 8/1971 United Kingdom ...................... 526/73

OTHER PUBLICATIONS

Swern "Organic Peroxides" vol. I. pp. 81-87 Wiley Interscience.
Brandrup et al., "Polymer Handbook" pp. II-1 to II 53 Interscience Publ.

Primary Examiner—Herbert J. Lilling

[57] ABSTRACT

A process for the free-radical polymerization of vinyl aromatic monomers in at least two thermally distinct polymerization stages each between the temperatures of about 70° C and 150° C in the presence of at least two free-radical initiators, one of which initiators is particularly effective at the lowest temperature stage and has the formula

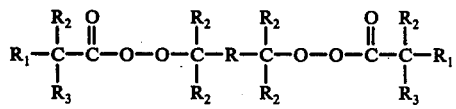

wherein R is an alkylene, alkynylene or alkenylene diradical, $R_1$ is alkyl, alkenyl, alkyn or alkoxy and Rhd 2 is lower alkyl and $R_3$ is hydrogen or a lower alkyl and a second of which initiators has a 10 hour half-life temperature of at least about 80° C which temperature is at least about 15° C above the 10 hour half-life temperature of the compound of the above formula.

11 Claims, No Drawings

FREE-RADICAL POLYMERIZATIONS USING MIXED INITIATOR SYSTEMS AT TWO THERMALLY DISTINCT POLYMERIZATION STAGES

BACKGROUND OF THE INVENTION

It is important in the commercial polymerization of vinyl monomers to perform the reaction in as short a period of time as possible and yet to obtain polymer product of high quality and in good yield. The process of the present invention represents an advance over the art known by accomplishing such desirata with conventional equipment, using increasingly higher, multistage temperature stages during polymerization and a mixture of initiators including a defined initiator particularly effective during the earliest, low temperature stage, and a different initiator more effective at the higher temperature. The process described is applicable to any of the bulk, suspension, or emulsion techniques.

PRIOR ART

It is known that combinations of initiators can be advantageously used in the polymerization of vinyl aromatic monomers, such as styrene in a multistage temperature polymerization. Such a process is described in U.S. Pat. No. 2,656,334, wherein a combination of benzoyl peroxide and tertiary butyl perbenzoate is used as the initiator in a two-stage temperature suspension polymerization of styrene; the first stage is conducted at a temperature lower than 95° C. (until at least 65% conversion is attained) and the second at about 100°–150° C. The overall polymerization time is 9 to 10 hours. A modification of the U.S. Pat. No. 2,656,334 process using three separate temperature stages to provide a constant rate of free-radical generation to thereby reduce the polymerization period is described in U.S. Pat. No. 2,907,756. In each of the U.S. Pat. No. 2,656,334 and U.S. Pat. No. 2,907,756 processes, benzoyl peroxide is used as the low temperature initiator component.

A two-stage temperature polymerization process wherein a single unsymmetrical diperester initiator is used in the polymerization of vinyl monomers is described in U.S. Pat. No. 3,585,176. The unsymmetrical diperesters described in this patent contain two peroxy groups of different reactivities and therefore decompose into free-radicals at the two different temperatures.

A process for the polymerization of styrene in the presence of a three component initiator system under a programmed, continuously increasing temperature cycle is described in British Pat. No. 1,243,197. It is claimed that by using this process one can reduce the polymerization period. Similarly, U.S. Pat. No. 3,817,965 and Canadian Pat. No. 892,672 utilize programmed, continuously increasing temperature cycles and one or more free radical initiators to reduce the polymerization period. However, use of the "increasing temperature" process requires modification of most of the present commercial reactors whereas the process of the present invention does not require any such modification.

SUMMARY OF THE INVENTION

A process for the free-radical polymerization of vinyl monomers including vinyl aromatic monomers in at least two thermally distinct polymerization stages, each between the temperatures of about 70° C. and 150° C. in the presence of at least two free-radical initiators, one of which initiators is particularly effective at the lowest temperature stage and has the formula

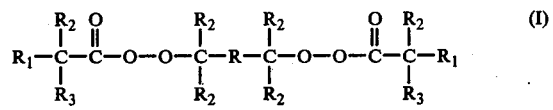

and wherein R is an alkylene, alkynylene or alkenylene diradical, $R_1$ is alkyl, alkenyl, alkynl or alkoxy and $R_2$ is lower alkyl and $R_3$ is hydrogen or lower alkyl and a second of which initiators has a 10 hour half-life temperature of at least about 80° C. which is at least about 15° C. above the 10 hour half-life temperature of the compound of structure (I).

In the process of the present invention, it is essential that the polymerization be performed at two or more increasingly higher temperature sequences and that the initial reaction be at a relatively low temperature, i.e., below about 100° C. until the monomer consumption is at least about 40% completed which will occur when the polymerization period equals about three times the half-life of the low temperature initiator component. In the next stage the temperature is at least about 15° C. above the initial temperature and the polymerization is continued until monomer consumption is at least 99% complete. Usually, the final polymerization temperature will be above 100° C. The optimum temperature to use in the initial and final stages will depend upon the identity of the particular initiators chosen for the monomer being polymerized. Temperatures as low as 40° C. are sometimes useful in the initial stage although a temperature of about 70° C. is preferred.

In the final polymerization stage, during which the remaining monomer is polymerized, the polymerization system is subjected to more intense heat. Although generally it is recognized that an increase in energy input into a polymerization system to increase the speed of the reaction is done at the sacrifice of molecular weight of the product, the process of the present system produces high molecular weight product in a relatively overall short polymerization period. While higher temperatures will sometimes be found useful, usually the higher temperature polymerization stage will be performed below about 150° C.; a temperature between about 115° C. and 135° C. is preferred.

The initiator particularly effective for the low temperature stage is identified in Formula I above. The initiator of particular effectiveness for the higher temperature stage is not critical, provided it is an initiator known to be effective at the upper temperature for the particular monomer.

As the high temperature effective initiator component or, in minor proportions, as an adjunct for either the lower temperature or higher temperature initiator, the mixture system of the present invention may additionally contain one or more free-radical generating azo and/or peroxide initiators that are well known in the prior art. A partial list of such initiators useful as a high temperature initiator includes 1,1-bis(t-butylperoxy)-3,3,5-trimethyl cyclohexane
2,2-bis(t-butylperoxybutane),
t-butylperoxy isopropyl carbonate,
Di-t-butyldiperoxyazelate,
t-butyl peracetate, t-butyl perbenzoate,
dicumyl peroxide,
alpha-alpha'-bis(t-butylperoxy)diisopropyl benzene,
2,5-dimethyl-2,5-bis(benzoylperoxy) hexane,
di-t-butylperoxide,
2-t-butylazo-2-cyanopropane,
1-t-butylazo-1-cyanocyclohexane,
1,1'-azo-bis-cumene A partial list of such initiators useful as a low temperature initiator adjunct includes:
2,2'-azo-bis-2-methylvaleronitrile,
t-butyl peroxypivalate,
t-butyl peroxyneodecanoate,
t-butyl peroxy-2-ethylhexoate,
dibenzoyl peroxide,
dilauroyl peroxide At least 50% of the low temperature component should be within the Formula I.

The optimum total weight of the initiator in the mixture system used pursuant to the process of the present invention for polymerization and/or copolymerization will depend upon the polymerization technique used, the identity of the monomer or monomers and the identity of the initiators in the system. Too little initiator will inordinately lengthen the polymerization period; use of too much initiator is economically wasteful. Generally, the shortest polymerization period will be found to require from 0.0001% to 2.0% total initiator by weight based on total monomer. Preferably, the total weight of initiator mixture will be from 0.001% to 1.0% by weight; for bulk polymerization most preferably, use of from 0.01% to 0.5% by weight is employed.

While the proportion of the high temperature sensitive initiator to low temperature sensitive initiator may also vary widely, nevertheless, it will be appreciated by those skilled in the art that, since polymerization is faster at the higher temperature, the low temperature sensitive initiator should be present in the mixed initiator system in the major amount. The optimum proportion will depend upon the polymerization technique employed, the identity of the monomer and the identity of the particular initiators. Thus, for example, for suspension polymerizations of styrene, the proportion of high:low temperature sensitive initiators may be 1:1. On the other hand, when using the bulk polymerization technique for styrene, it is recommended that at least twice as much low temperature sensitive initiator be used than high temperature sensitive initiator. Indeed, at times, a proportion of high:low temperature sensitive initiators of 1:8 will be found advantageous.

The period of polymerization must be adjusted for each polymerization system to obtain optimum results, i.e., the shortest period possible to obtain product of high molecular weight in high yield (greater than 99% conversion). It will be obvious that shorter periods can be employed by increasing the energy supply to the system; however, as pointed out previously, for any initiator system an optimum temperature-period will be observed above which speed of reaction is increased only at the sacrifice of high molecular weight. For instance, when using 2,5-dimethyl-2,5-bis[2-ethylhexanoylperoxy]hexane as the low temperature sensitive initiator and 2,5-dimethyl-2,5bis[benzoylperoxy]hexane as the high temperature sensitive initiator in styrene bulk polymerizations, in proportions of high:low varying from 1:2 to 1:8 and with total mixed initiators of from 0.19 to 0.3% based on weight of monomer, a low temperature stage for 4 hours at about 90° C. and a high temperature stage for about 3 hours at 120° C. has been found very effective. For the same type of system, the use of more temperature stages, with a somewhat higher final stage has been found to reduce the polymerization period to a total of about 6 hours, using an initial polymerization stage at 90° C. for 3 hours, an intermediate polymerization stage of about 115° C. for 2 hours and a final finishing polymerization stage at 130° C. for 1 hour.

The process of the present invention is applicable to all free-radically polymerizable monomers, either alone or mixtures of two or more different monomers. The copolymerizability of two or more different monomers can be determined readily from their reactivy ratios. The reactivity ratios for different monomer pairs is available in the literature e.g. *Polymer Handbook*, 2nd Edition, Edited by Brandrup and Immergut, 1975, John Wiley & Sons, New York.

Although the process of the present invention is particularly described in terms of the polymerization of styrene, it is applicable as well to polymerization and/or copolymerization of the more common monomers which include:

vinyl acetate; vinyl chloride; vinylidene chloride; acrylonitrile; methacrylonitrile; methyl acrylate; methyl methacrylate; isobutyl methacrylate; lauryl methacrylate; diethyleneglycol dimethacrylate; trimethylol propane trimethacrylate; butadiene; isoprene; chloroprene; acrylamide; methacrylamide; maleic anhydride; di-allyl phthalate; di-allyl maleate etc.

As previously mentioned, the polymerization pursuant to the process of the present invention can be conducted by any of the well known methods such as bulk, solution, suspension and emulsion or by a combination of two or more of the above methods.

Where the polymerization is conducted in suspension, an aqueous medium with suspending agents such as polyvinyl alcohol, tricalcium phosphate, methyl cellulose, hydroxy ethyl cellulose, etc. is generally used. Based on the specific polymerization system, one or more suspending agents can be used, with or without other anionic and/or cationic surface active agents, which act as extenders. Additionally, alpha,beta-ethylenically unsaturated carboxylic acids, water soluble persulfates, sodium bisulfite, etc. can also be used as extenders.

Buffering agents can also be added to the suspension to control the pH of the medium. While the pH is not a major criterion in the practice of the present invention, depending on the specific system, proper adjusting the pH is beneficial for suspension stability.

When the polymerization is conducted in emulsion, an aqueous medium containing one or more surface active agents or emulsifiers is used. The type of surface active agent used is not critical and either the ionic type (i.e. anionic or cationic) or the non-ionic type may be used. It is also possible to use a combination of ionic and non-ionic surface active agents. The type of surface active agents used is determined by various factors such as emulsion stability during polymerization, desired end-use application, freeze-thaw stability of the emulsion, etc. These and other features of emulsion polymerization are described in the literature and thus obvious to one skilled in the art.

When the polymerization is conducted in solution, the selection of the solvent used will be influenced by factors such as the solubility of the polymer, the chain-transfer constant of the solvent, the boiling point, etc.

The process of the present invention can also be used in systems where one or more monomers is polymerized in the presence of one or more polymers. A typical example of this is in the manufacture of high impact polystyrene wherein styrene is polymerized in the presence of an elastomer.

The examples that follow are intended to illustrate the invention. They are not intended to limit it in any manner. It will be observed that both bulk polymerization and suspension polymerization techniques are described in the examples. The manipulative techniques employed in each of these types of polymerizations is described below under appropriate headings.

ILLUSTRATIVE EXAMPLES

Styrene Bulk Polymerization

Based on a charge of 5 g. monomer (styrene), the amount of each initiator component required was calculated using its assay value. Thus all initiator concentrations are expressed on a pure basis. The initiators were then weighed in "petti-cups" which were then placed in previously cleaned Pyrex test-tubes, 18 × 150 mm. The test-tubes were tared, then 5 g. of distilled styrene was added, after which they were chilled in ice-water, purged with nitrogen and sealed with a flame-torch.

The sealed test-tubes were immersed in a thermostated, stirred oil-bath which was held constant to within ±0.1° C.

At the end of polymerization, the test-tubes were removed from the oil-bath, placed in previously cooled copper tubes and then in a freezer (to assure that there was no post-polymerization) for at least ½ hour. Then the test-tubes were broken and the polymer was dissolved in 50 ml. of benzene (containing 0.01 g. benzoquinone per liter of benzene). A portion of this solution was used to determine the residual styrene content by gas chromatography. The remaining solution was precipitated in 300 ml. of methanol with stirring. The polymer was filtered and dried in a vacuum oven at 50° C.

To calculate the viscosity-average molecular weight, ($\overline{M}_v$), a benzene solution of the polymer (0.5g/dl) was used to measure the viscosity in a Cammon-Ubbelhode viscometer at 25° C. By extrapolating the viscosity data to zero concentration in the usual manner, the value of intrinsic viscosity ([n]) was obtained from which $\overline{M}_v$ was calculated by using the following relationship from J. Phys. Chem. 67, 566 (1963):

$$[n] = KM_v^a$$

where
$K = 9.18 \times 10^{-5}$
$a = 0.743$

Styrene Suspension Polymerization

The aqueous phase used in the polymerization was prepared by dissolving 1.0 g. of polyvinyl alcohol (AIRCO, VINOL-540 and 0.02 g. of sodium lauryl sulfate (Duponol ME) in 40 g. of de-ionized water. The solution was then transferred to the polymerization reactor and a styrene solution consisting of 200 g. styrene and the required amount of initiators was added. The resulting mixture was polymerized at the desired temperatures, with continuous stirring.

After polymerization, polystyrene in the form of fine beads was removed by filtration, washed and dried.

A solution of the dried polymer in benzene was used to measure the intrinsic viscosity and calculate the viscosity-average molecular weight.

INITIATOR ABBREVIATIONS USED IN EXAMPLES

BPO: benzoyl peroxide
TBPB: tertiary butyl perbenzoate
LUPERSOL 256: 2,5-dimethyl-2,5-bis[2-ethylhexanoylperoxy]hexane
LUPEROX 118: 2,5-dimethyl-2,5-bis[benzoylperoxy]hexane
LUPERSOL 331: 1,1-bis(t-butylperoxy)cyclohexane
R-262: Di-t-butyl diperoxycarbonate
R-233: Ethyl-3,3-bis(t-butylperoxy)butyrate

EXAMPLE 1

STYRENE BULK POLYMERIZATION

According to the process of the present invention, an initiator system consisting of a blend of 2,5-dimethyl-2,5-bis(2-ethylhexanoyl-peroxy)hexane (LUPERSOL 256) and 2,5-dimethyl-2,5-bis(benzoylperoxy)hexane (LUPEROX 118) is used in two-stage styrene bulk polymerization. The results obtained with this system are compared with the control system, which is an initiator blend of BPO and TBPB.

| System | Composition |
|---|---|
| A | 0.25 phm LUPERSOL 256 + 0.05 phm LUPEROX 118 |
| B | 0.25 phm benzoyl peroxide (BPO) + 0.05 phm t-butylperbenzoate (TBPB) |

"phm" refers to parts by weight of initiator per hundred parts by weight of monomer.

The first stage of polymerization was conducted at 90° C. for 4 hours and the second stage at 120° C. for three hours.

The results obtained with the two initiator systems are as follows:

| System | % Conversion | $\overline{M}_v \times 10^{-5}$ |
|---|---|---|
| A | 99.9 | 2.39 |
| B | 99.9 | 1.55 |

These results show that under comparable conditions, higher molecular weight polymer is obtained with the present invention, i.e. System A.

EXAMPLE 2

STYRENE BULK POLYMERIZATION

A three component initiator system consisting of LUPERSOL 256, LUPEROX 118 and R-262 was used. The initiator system was a blend of 0.25 phm LUPERSOL 256 + 0.025 phm LUPEROX 118 + 0.025 phm R-262. The polymerization was conducted in 2 distinct, constant temperature stages. The first stage was for 4 hours at 90° and the second stage was 3 hours at 120° C. The results obtained were a conversion of 99.9% and $\overline{M}_v$ of 2.06 × 10⁵.

For commercial acceptability, polystyrene should have a viscosity-average molecular weight of about 200,000–300,000 depending on the specific end-use application. The results from the two examples show that commercially acceptable molecular weight polymers

EXAMPLE 3

STYRENE BULK POLYMERIZATION

The following four initiator systems were evaluated in a two stage styrene polymerization process.

| System | Composition |
|---|---|
| 3A | 0.15 phm BPO + 0.07 phm TBPB |
| 3B | 0.15 phm LUPERSOL 256 + 0.05 phm LUFEROX 118 + 0.02 phm TBPB |
| 3C | 0.15 phm LUPERSOL 256 + 0.05 phm LUPERSOL 331 + 0.02 phm TBPB |
| 3D | 0.15 phm LUPERSOL 256 + 0.05 phm LUPEROX 118 + 0.02 phm R-262 |

The first stage of the polymerization was conducted at 90° C. for four hours and the second stage at 120° C. for 3 hours.
The results obtained are as follows:

| System | % Conversion | $\bar{M}_v \times 10^{-5}$ |
|---|---|---|
| 3A | 99.9 | 2.36 |
| 3B | 99.9 | 2.88 |
| 3C | 99.8 | 2.66 |
| 3D | 99.9 | 2.62 |

Initiator systems 3B, 3C and 3D which contain LUPERSOL 256 as one of the components, gave higher molecular weight polymer than the control system (i.e. System 3A).

EXAMPLE 4

STYRENE BULK POLYMERIZATION

The following four initiator systems were evaluated in a three-stage styrene polymerization process.

| System | Composition |
|---|---|
| 4A | 0.15 phm BPO + 0.07 phm TBPB |
| 4B | 0.15 phm BPO + 0.05 phm LUPEROX 118 + 0.02 phm TBPB |
| 4C | 0.15 phm LUPERSOL 256 + 0.05 phm LUPEROX 118 + 0.02 phm TBPB |
| 4D | 0.15 phm LUPERSOL 256 + 0.05 phm LUPEROX 118 + 0.02 phm R-233 |

The first stage of the polymerization was conducted at 90° C. for three hours, the second stage at 115° C. for 2 hours and the third stage at 130° C. for 1 hour.
The results obtained are as follows:

| Blend | % Conversion | % Residual Styrene | $\bar{M}_v \times 10^{-5}$ |
|---|---|---|---|
| 4A | 99.9 | 0.06 | 2.24 |
| 4B | 99.8 | 0.19 | 2.33 |
| 4C | 99.9 | 0.08 | 2.98 |
| 4D | 99.9 | 0.06 | 3.04 |

These results show that by using the process of the present invention (i.e. blends 4C and 4D), higher molecular weight polymer is obtained under comparable conditions.

For commercial acceptability, the polymer produced should be substantially free of monomer, i.e. residual monomer content of 0.1% or less. The above results show that this can be accomplished readily by the process of the present invention.

EXAMPLE 5

STYRENE SUSPENSION POLYMERIZATION

The following initiator blends were evaluated in a two-stage suspension polymerization system.

| Blend | Composition |
|---|---|
| 5A | 0.075 phm LUPERSOL 256 + 0.075 phm LUPEROX 118 |
| 5B | 0.075 phm LUPERSOL 256 + 0.075 phm TBPB |

The first stage of polymerization was conducted at 90° C. for 3 hours and the second stage at 115° C. for 4 hours. The results obtained were as follows:

| Blend | % Conversion | $\bar{M}_v \times 10^{-5}$ |
|---|---|---|
| 5A | 99.5 | 3.93 |
| 5B | 99.5 | 3.95 |

In the prior art process of British Pat. No. 1,366,976, an initiator blend of di-t-butylperoxyhexahydroterephthalate (0.13 phm) and t-butyl perbenzoate (0.05 phm) was used. A viscosity-average molecular weight of 340,000 was obtained by conducting the polymerization at 90° C. for 7 hours and 4 hours at 115° C. (i.e. total polymerization time of 11 hours). See results listed under Example IV in British Pat. No. 1,366,976.

In contrast, the process of the present invention presents the advantages of shorter polymerization time and higher molecular weight plus use of less total initiator.

Many equivalent modifications of the above-described process will become apparent to those skilled in the art from a reading of this disclosure without departure from the inventive concept.

What is claimed is:

1. A process for the free-radical polymerization of vinyl monomers, including vinyl aromatic monomers, comprises polymerizing said vinyl monomers in at least two thermally distinct polymerization stages, each between the temperatures of about 70° C. and 150° C. in the presence of at least two free-radical initiators, one of which initiators is particularly effective at the lowest temperature stage and has the formula

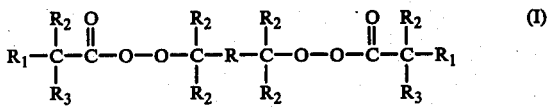

and where R is an alkylene, alkynylene or alkenylene diradical, $R_1$ is alkyl, alkenyl, alkynl or alkoxy and $R_2$ is lower alkyl and $R_3$ is hydrogen or lower alkyl and a second of which initiators have a 10 hour half-life temperature of at least about 80° C., said temperature being at least about 15° C. above the 10 hour half-life temperature of the compound of Formula (I) wherein the same solvent is used for measuring the half-life of all initiators, wherein the initiator of Formula (I) allows completing the polymerization in a shorter time with the resulting polymer having a higher viscosity-average molecular weight than without the initiator of Formula (I).

2. The process of claim 1 wherein the vinyl monomer is a vinyl aromatic monomer.

3. The process of claim 2 wherein the vinyl aromatic monomer is styrene.

4. The process of claim 3 wherein the initiator of formula (I) is 2,5-dimethyl-2,5-bis[2-ethylhexanoylperoxy]hexane.

5. The process of claim 4 wherein said second initiator is 2,5-dimethyl-2,5-bis[benzoylperoxy]hexane.

6. The process of claim 4 wherein said second initiator is a mixture of 2,5-dimethyl-2,5-bis[benzoylperoxy]hexane and di-t-butyl diperoxycarbonate.

7. The process of claim 4 wherein said second initiator is a mixture of 1,1-bis(t-butylperoxy)cyclohexane and tertiary butyl perbenzoate.

8. The process of claim 4 wherein said second initiator is a mixture of 2,5-dimethyl-2,5-bis[benzoylperoxy]hexane and ethyl(3,3-bis(t-butylperoxy)butyrate.

9. The process of claim 4 wherein said initiators are used in a bulk polymerization technique.

10. The process of claim 4 wherein said initiators are used in a suspension polymerization technique.

11. The process of claim 4 wherein the polymerization stages are between the temperatures of 90° C. and 130° C.

* * * * *